UNITED STATES PATENT OFFICE.

JAMES STEWART, OF PHILADELPHIA, PENNSYLVANIA, ASSIGNOR TO MATTHEW McVICKAR AND ROBERT S. GALBRAITH, OF SAME PLACE.

COMPOUND FOR WATERPROOFING.

SPECIFICATION forming part of Letters Patent No. 475,713, dated May 24, 1892.

Application filed February 24, 1891. Serial No. 382,603. (No model.)

*To all whom it may concern:*

Be it known that I, JAMES STEWART, a citizen of the United States, residing in the city and county of Philadelphia, State of Pennsylvania, have invented a new and useful Improvement in Compounds for Waterproofing, which improvement is fully set forth in the following specification.

My invention consists of a compound for waterproofing formed of materials substantially as hereinafter set forth; and in carrying out the same I take two pounds of ground leather, two pounds of paper-pulp, two pounds of whiting, one gallon of rosin-oil, two gallons of linseed-oil, two gallons of naphtha, two pounds of dissolved hair, one pound of China-clay, and one pound of glue or gelatine and thoroughly combine the same, and then subject the mass to the action of carbonic-acid gas, which is directed into the vessel containing said mass, thoroughly permeating the same and increasing the bulk thereof and adding to the plasticity of the glutinous mixture, which is adapted to be spread on suitable fabric or material by rollers, brushes, or other desired means, it being seen that the fabric or other material to which the compound is applied possesses a thick, glossy, and elastic surface, which, if desired, may be further coated with varnish, shellac, &c. The dissolved hair in the composition is prepared by boiling the same in oil at a high temperature and afterward passing it between grinding-stones. The proportions named may be varied according to circumstances. The glue or gelatine is preferably that extracted from hog-skin.

Having thus described my invention, what I claim as new, and desire to secure by Letters Patent, is—

A composition of matter for waterproofing purposes, consisting of ground leather, paper-pulp, whiting, rosin-oil, linseed-oil, naphtha, dissolved hair, china-clay, and glue or gelatine, in the proportions stated.

JAMES STEWART.

Witnesses:
JOHN A. WIEDERSHEIM,
A. P. JENNINGS.